(12) United States Patent
Von Braun

(10) Patent No.: US 12,354,532 B2
(45) Date of Patent: Jul. 8, 2025

(54) METHOD AND SYSTEM FOR OPERATING AN ACTIVE DISPLAY

(71) Applicant: H2VR HoldCo, Inc., Covina, CA (US)

(72) Inventor: Max Von Braun, Hamburg (DE)

(73) Assignee: H2VR HoldCo, Inc., Covina, CA (US)

( * ) Notice: Subject to any disclaimer, the term of this patent is extended or adjusted under 35 U.S.C. 154(b) by 0 days.

(21) Appl. No.: 18/558,442

(22) PCT Filed: May 2, 2022

(86) PCT No.: PCT/EP2022/061734
§ 371 (c)(1),
(2) Date: Nov. 1, 2023

(87) PCT Pub. No.: WO2022/233799
PCT Pub. Date: Nov. 10, 2022

(65) Prior Publication Data
US 2024/0242662 A1    Jul. 18, 2024

(30) Foreign Application Priority Data

May 2, 2021   (EP) ..................................... 21171736
Aug. 5, 2021  (EP) ..................................... 21189860

(51) Int. Cl.
*H04N 21/2343*   (2011.01)
*G09G 3/20*      (2006.01)
(Continued)

(52) U.S. Cl.
CPC ............. *G09G 3/32* (2013.01); *G09G 3/2007* (2013.01); *G09G 3/3208* (2013.01);
(Continued)

(58) Field of Classification Search
CPC ...... G09G 3/32; G09G 3/2007; G09G 3/3208; G09G 2320/0233; G09G 2320/0247;
(Continued)

(56) References Cited

U.S. PATENT DOCUMENTS

2008/0068359 A1   3/2008   Yoshida et al.
2009/0102957 A1   4/2009   Phelan
(Continued)

FOREIGN PATENT DOCUMENTS

EP    3574651 A1    12/2019
EP    4080866 A1    10/2022
(Continued)

OTHER PUBLICATIONS

International Search Report and Written Opinion corresponding to Application No. PCT/EP2022/061734, dated Nov. 25, 2022, 24 pages.
(Continued)

*Primary Examiner* — Abdul-Samad A Adediran
(74) *Attorney, Agent, or Firm* — Downs Rachlin Martin PLLC

(57) ABSTRACT

A method for operating a display comprising providing a first feed of a first sequence of image data and providing a second feed of a second sequence of image data, the second feed comprising a second sequence of image data and a second complementary sequence of image data. The display is operated at a high display frame rate (HDFR) comprising HDFR image slots/slices during a standard frame rate (SFR) time interval. The method includes displaying the first feed and the second feed in a time-sliced multiplexed manner in the HDFR image slots of each SFR time interval. The first feed and the second feed comprise gray images obtained from the combination of image data presented at equal luminance and being evenly distributed within the HDFR image slots so the luminance changes of the display occur at frequencies greater than or equal to twice the SFR.

17 Claims, 4 Drawing Sheets

| i  | 1   | 2   | 3   | 4   | 5   | 6   | 7   | 8   | 9   | 10  | 11  | 12  |
|----|-----|-----|-----|-----|-----|-----|-----|-----|-----|-----|-----|-----|
| L  | 1.0 | 1.0 | 1.0 | 0.3 | 0.3 | 1.0 | 1.0 | 1.0 | 1.0 | 0.3 | 0.3 | 1.0 |
| F0 | F0  | F0  | F0  |     |     | F0  | F0  | F0  | F0  | F0  | C0  | F0  |
| F1 |     |     |     | F1  | C1  |     |     |     |     |     |     |     |
| F2 |     |     |     |     |     |     |     |     |     |     |     |     |
|    |     |     |     |     |     |     |     |     |     |     |     |     |

◄──────────── 20 msec ────────────►

(51) Int. Cl.
*G09G 3/32* (2016.01)
*G09G 3/3208* (2016.01)

(52) U.S. Cl.
CPC .............. *G09G 2320/0233* (2013.01); *G09G 2320/0247* (2013.01); *G09G 2320/0257* (2013.01); *G09G 2320/0626* (2013.01); *G09G 2340/0435* (2013.01)

(58) Field of Classification Search
CPC ... G09G 2320/0257; G09G 2320/0626; G09G 2340/0435; H04N 21/8456
See application file for complete search history.

(56) References Cited

U.S. PATENT DOCUMENTS

| | | | |
|---|---|---|---|
| 2011/0134231 A1 | 6/2011 | Hulvey et al. | |
| 2019/0364309 A1* | 11/2019 | Von Braun | H04N 21/8456 |
| 2020/0388211 A1 | 12/2020 | Zhang et al. | |
| 2021/0297717 A1 | 9/2021 | Braun | |

FOREIGN PATENT DOCUMENTS

| | | |
|---|---|---|
| WO | 2018138366 A1 | 8/2018 |
| WO | 2020021068 A1 | 1/2020 |
| WO | 2020253249 A1 | 12/2020 |

OTHER PUBLICATIONS

EP Search Report and Opinion corresponding to Application No. EP 21189860, dated Mar. 10, 2022, 17 pages.

\* cited by examiner

| i  | 1   | 2   | 3   | 4   | 5   | 6   | 7   | 8   | 9   | 10  | 11  | 12  |
|----|-----|-----|-----|-----|-----|-----|-----|-----|-----|-----|-----|-----|
| L  | 1.0 | 1.0 | 1.0 | 0.3 | 0.3 | 1.0 | 1.0 | 1.0 | 1.0 | 0.3 | 0.3 | 1.0 |
| F0 | F0  | F0  | F0  |     |     | F0  | F0  | F0  | F0  | F0  | C0  | F0  |
| F1 |     |     |     | F1  | C1  |     |     |     |     |     |     |     |
| F2 |     |     |     |     |     |     |     |     |     |     |     |     |
|    |     |     |     |     |     |     |     |     |     |     |     |     |

◄──────── 20 msec ────────►

*Fig. 3*

| i  | 1   | 2   | 3   | 4   | 5   | 6   | 7   | 8   | 9   | 10  | 11  | 12  |
|----|-----|-----|-----|-----|-----|-----|-----|-----|-----|-----|-----|-----|
| L  | 1.0 | 1.0 | 1.0 | 0.3 | 0.3 | 1.0 | 1.0 | 1.0 | 1.0 | 0.3 | 0.3 | 1.0 |
| F0 | F0  | F0  | F0  |     |     | F0  | F0  | F0  | F0  |     |     | F0  |
| F1 |     |     |     | F1  | C1  |     |     |     |     |     |     |     |
| F2 |     |     |     |     |     |     |     |     |     | F2  | C2  |     |
|    |     |     |     |     |     |     |     |     |     |     |     |     |

◄──────── 20 msec ────────►

*Fig. 4*

METHOD AND SYSTEM FOR OPERATING AN ACTIVE DISPLAY

CROSS-REFERENCED APPLICATIONS

The present application is a U.S. National Stage Application of International Application No. PCT/EP2022/061734 filed May 2, 2022 and published on Nov. 10, 2022 as WO 2022/233799 A2, which claims the benefit and priority of European Patent Application No. 21171736.8 filed May 2, 2021 and European Patent Application No. 21189860.6 filed Aug. 5, 2021, each of which is incorporated herein by reference in its entirety for any purpose whatsoever.

FIELD OF THE DISCLOSURE

The present disclosure concerns a method and a system for operating an active display, especially a LED display, where more than one sequence of image data is shown on the active display in a time-sliced multiplexed manner.

BACKGROUND

In recent years, active displays such as light-emitting diode (LED) displays have found a variety of applications ranging from computer displays or television screens in the office or household environment where typically a single display or two or three separate displays are used, to large-scale applications in the advertisement or entertainment industries where multiple LED panels are essentially seamlessly joined together to create LED rows or LED walls. In the context of the present application, reference will predominantly be made to LED displays as typical examples of active displays but it will be evident that the technology described herein can be used for other types of active displays as well, especially active pixel-based displays such as active-matrix organic light-emitting diode (AMOLED) displays, plasma displays or quantum dot displays. Moreover, in the context of the present application, a row or column of LED-displays or LED-panels will refer to individual LED displays/panels joined together in one dimension (for instance, as a horizontal row or a vertical column), while LED wall refers to multiple LED panels joined together in two dimensions. Rather than showing the same image data/video content on each panel, suitable control equipment is usually used to distribute each image frame on the available number of LED panels so that the viewer gets the impression of a single display having huge dimensions. Moreover, in the context of the present disclosure, a sequence of image data shown on the active display will also be described as a "video stream". In general, the term "video stream" shall also refer to any type of image content shown on the LED displays, for instance to actual video streams of a sequence of image frames shown in succession or to still images, even monochromatic still images. In this sense, "video stream" also comprises the case where a single still image is only presented once, i.e. without having to alter image content or re-sent image content to the LED display at a certain frame rate.

LED or OLED (AMOLED) displays are a common display technology in a large variant of appliances ranging from TV or computer screens to media displays in vehicles and cell phones. LED displays in the form of walls, rows or columns are widely used as billboards or signboards to convey information or advertisements to the viewers. Moreover, LED walls recently became increasingly popular in the entertainment industry for providing background and illumination in virtual studio settings.

In the past, a single a dedicated sequence of image data (or single video stream) has been shown on an active display. However, in recent years, new technological developments required the insertion of additional image content in the sequence of image data where individual images (or frames) of different sequences of image data are interleaved with each other. In these cases only one sequence of image data (here denoted as the "first sequence of image data" is intended to be seen, in the sense of consciously recognized, by direct viewers while interleaved further sequences of image data are usually hidden from being seen or recognized by the direct viewers.

Typical examples include applications, where the active display is part of a scenery which is captured/filmed by a camera such as a video camera or a still photography camera.

One of these applications relates to virtual studios where walls made of LED displays, especially fine pitch displays, have replaced conventional green screen or blue screen background panels/screens. This allows the background scenery to be presented on the LED wall (i.e. as a first treatment of image data) while filming the foreground together with the background, which significantly reduces the amount of video post-production. As described in applicants European patent application EP21169258.7 it can be useful to present further sequences of image data on the LED displays interleaved with the first sequence of image data, for instance chromakey image data and/or tracking pattern image data for identifying the position and relative orientation of LED displays within the scenery and the camera capturing the scenery.

In other applications, it can be desired that the direct viewer can see features or information which should not be captured by cameras, for instance text prompting or any kind of locators that are not wanted in the recordings of the scenery by a camera.

Another application relates to so-called "virtual advertisement". At sports events, such as football matches, there are usually many LED displays installed in a stadium on which advertisement content is presented during the sports event. When videos of a sports event are broadcasted around the world, the specific advertisement content at the event will also be seen in the video. However, certain advertisements will only be relevant for audiences in certain locations and, more importantly, certain advertisements which are allowed in one country might even be prohibited by law in other countries. Virtual advertisement provides a solution to these problems by identifying the LED displays in the captured video and replace the actual content shown in the stadium by alternative content depending on the respective target audiences. To this effect, it is not only necessary to identify the location of the LED displays within the image, but also to identify the position and orientation of the camera with respect to the specific LED display. Therefore, similar problems as in video studios arise at sports events in the context of virtual advertisement as well, namely to allow identifying the location of the LED displays and the orientation of the camera, for instance by introducing additional image content such as chromakey images and tracking patterns.

As an alternative solution to virtual advertisement techniques described above, the present applicant has developed a method allowing different image content intended for different audiences to be shown on active displays, such as LED signboards, in a time-sliced multiplexed manner. Videos of the scenery are generated with one or more video cameras being synchronized to different sequences of image data shown on the active displays so that multiple videos of a scenery can be produced which are identical as far as the overall scenery is concerned but which show different image on the LED signboards. This technology is for instanced described in applicant's international patent application WO 2018/138366 A1.

The above-described technologies demonstrate that there are multiple applications where active displays such as LED panels are part of a scenery which is recorded by video cameras, TV cameras or even still photography cameras or mobile phone/tablet cameras, and where these active displays show different image content in a time-sliced multiplexed manner. In all these applications, there are not only cameras which record the scenery present but also human beings who are part of the scenery (in the following denoted as "persons" or "direct viewers"), for instance as an audience at a sports event or an entertainment event, or as actors or studio personnel in a movie studio and who are therefore watching the scenery including any active display present in the scenery. When these active displays are operated in a manner in which different sequences of image data are presented in a time-sliced multiplexed manner, only one of these sequences of images is typically intended to be seen or recognized by persons present in or close to the scenery. In US patent application US 2009/102957 A, it has been suggested that the further sequences of image data are presented only for such are small portion of the time interval of a recording frame rate that the relevant image content cannot be seen or recognized by persons. In applicant's WO 2018/138366 A1, this concept has been developed further by suggesting that the further sequences of image data are presented as sequences of images and corresponding inverse/complementary images.

However, when two or more unrelated sequences of image data are interleaved with each other, several problems can occur. Even very short introductions of additional image data can lead to noticeable flickering of the active display even if the image data themselves cannot be recognized. Moreover, as the human eye integrates over within the temporal resolution of the eye (typically in the range of 40 ms), introduction of additional image data will lead to a noticeable increase in the black-level of the first sequence of image data seen or recognized by direct viewers, particularly in darker areas of the images.

SUMMARY

Therefore, it is an object of the present disclosure to provide a method and a system for presenting different sequences of image data in a time-sliced multiplexed manner on one or more active displays which are part of a scenery in such a manner persons present within or close to the scenery have an improved viewing experience of the first sequence of image data intended to be seen by them, especially in terms of minimizing flickering and avoiding noticeable increase of black levels, while still allowing recording of the scenery in synchronization with one or more of the sequences of image data under a broad range of environmental lighting conditions. Moreover, in state of the art video or movie studios, a control system is employed that allows to level all light sources through one controller. There is a need to synchronize all those light sources to avoid flicker, pulsation, off colors effects, etc.

This technical problem is solved by the method defined in present claim 1. Further embodiments of the present disclosure are subject to the dependent claims.

Accordingly, the present disclosure relates to a method for operating an active display comprising an array of active light-emitting elements, said method comprising the steps of:

providing a first feed of a first sequence of image data ($F0_k$) intended to be seen by direct viewers;

providing at least one second feed of a second sequence of image data ($F1_k,C1_k$; $F2k,C2_k$; $F3_k,C3_k$) not intended to be seen by said direct viewers, said at least second feed comprising a second sequence of image data ($F1_k$; $F2_k$; $F3_k$) and a second complementary sequence of image data ($C1_k$; $C2_k$; $C3_k$) consisting of inverse/complementary image data to said second sequence of image data such that the combination of each image ($F1_k$ and $C1_k$; $F2_k$ and $C2_k$; $F3_k$ and $C3_k$) results in homogenous gray images;

selecting a standard frame rate (SFR) at which said first and said at least second sequences of image data are presented on said active display;

operating the active display at a high display frame rate (HDFR) comprising nd HDFR image slots/slices during a standard frame rate time interval $\Delta T=1/SFR$ of said standard frame rate (SFR), each HDFR image slot having a duration $\tau_i$ with $$\sum_{i=1}^{nd}\tau_i = \Delta T = \frac{1}{SFR};$$

presenting said image data of said first feed and said at least second feed in a time-sliced multiplexed manner on said active display in said nd HDFR image slots of each standard frame rate time interval, wherein the time-integrated luminance of said first sequence of image data presented during a standard frame rate time interval is higher than the sum of the time-integrated luminances of said second sequences of image data;

wherein at least two feeds of said first feed and said at least one second feed comprise said gray images obtained from said combination of image data and complementary image data ($F1_k$ and $C1_k$; $F2_k$ and $C2_k$; $F3_k$ and $C3_k$), said gray images being presented at equal luminance on said active display and being evenly distributed within said nd HDFR image slots in such a manner that luminance changes of said active display occur at frequencies greater than or equal to twice said standard frame rate (SFR).

According to the present disclosure, an "active display" is an array of active light elements, capable of emitting light when passing an electric current through the elements, such as an LED, an AMOLED array, an array of plasma cells or an array of quantum dots. The term "light" in the sense of the present disclosure denotes electromagnetic radiation commonly described using the term "light", in particular visible light having a wavelength range from 400 to 700 nm but also infrared light at longer wavelengths and ultraviolet light at shorter wavelengths.

In the context of the present disclosure, a "feed" denotes a sequence of image data which are related to each other, e.g. which can be frames of a certain video. A feed is characterized by the rate, at which new data content instances which are denoted "image data" in the present disclosure but which can also be considered as individual images or "frames" are presented. In the context of a video, the frame rate of the feeds defines the "standard frame rate". In the context of the present disclosure, the lowest standard frame rate is at around the fusion rate of the human eye, i.e. the rate, at which the human eye can no longer discern individual images but views individual images as a video stream.

Typically, the lowest standard frame rate in this context is at around 24 Hz or 25 Hz. However, higher standard frame rates such as 50 Hz or 60 Hz are more common.

A "sequence of image data" $Fx_k$ in the sense of the present disclosure is a sequence x (x=1, 2, 3, . . ) of two-dimensional image information which is transmitted to or stored in the active display where one element k of the sequence of image data typically represents one individual image shown on the active display and where subsequent images (k+1, k+2, . . . ) of a given sequence of image data are presented in subsequent standard frame rate time intervals $\Delta T=1/SFR$ on the physical display. Within a standard frame rate time interval $\Delta T$ a given image of each sequence of image data can be presented one or more times. Each individual sequence of image data typically represents a video stream shown on the active display where image content from one image of the sequence to the image of the sequence can vary. Image content from one image to the subsequent image can, however, also remain unchanged, for instance if no movement is depicted in the video stream. In other embodiments, a sequence of image data can also contain still images which are shown over several standard frame rate time intervals $\Delta T$. In other embodiments, a sequence of image data may even contain only a single type of image which does not vary throughout the sequence of image data at all, for instance a monochromatic image or a tracking pattern image.

The term "direct viewers" in the sense of the present disclosure denotes human beings present at the venue/scenery at which the active display is operated at which are capable of directly viewing the active display.

The term "intended to be seen by said direct viewers" means that the first sequence of image data $F0_k$ is presented in such a manner that the direct viewers are capable of viewing/recognizing the sequence of image data, for instance in the form of a still image or a sequence of still images or as part of a video when the sequence of image data is presented in a way at which individual images cannot be temporally resolved. The feed of the first sequence of image data $F0_k$ is therefore also denoted "venue feed".

The term "intended not to be seen by the direct viewers" describes a presentation of a further sequence of image data $F1_k, C1_k$; $F2_k, C2_k$; $F3_k, C3_k$ where, although light emanating from the active display in correspondence with images of said sequence of image data can reach the eyes of a direct viewer, the image data are presented in such a manner that the corresponding images cannot be seen/recognized by the human eye. This does not only refer to a temporal resolution in terms of video presentation but more broadly refers to the fact that the image data are presented in such a manner that neither individual images nor a sequence of images can be seen or recognized. The further sequences of image data $F1_k$; $F2_k$; $F3_k$, are denoted "parallel feeds".

In order to "hide" effectively, the at least one additional sequence of image data from being recognized or perceived by the direct viewers, it is preferred that the time-integrated luminance of which an image of the first sequence of image data is presented during a standard frame rate time interval $\Delta T=1/SFR$ is higher than the time-integrated luminance of the image of the at least one further sequence of image data presented during that time interval. If more than one further sequence of image data is presented, the time-integrated luminance of the first sequence of image data intended for the direct viewers is preferably higher than the sum of the time-integrated luminance of all further sequences of image data which are not intended to be seen by the direct viewers. Preferably, the time-integrated luminance of the first sequence of image data is higher by a factor of 2 or more, more preferably by a factor of 4 or more.

In order to decrease the impact of the further sequences of image data on the first sequence of image data even more, the at least one further sequence of image data comprises at least a second sequence of image data image data ($F1_k$; $F2_k$; $F3_k$) and at least a second complementary sequence of image data ($C1_k$; $C2_k$; $C3_k$) consisting of inverse or complementary image data to said second sequence of image data. Accordingly, each image $F1_k$ of the second sequence of image data is interleaved with its inverse/complementary image $C1_k$ within the same standard frame rate time interval $\Delta T=1/SFR$. The introduction of inverse images in order to reduce flickering of the active display for the direct viewers has already been described in detail in applicant's international patent application WO 2018/138366 A1. In certain embodiments the further sequences of image data include pairs of sequences of image data and inverse/complementary images, the time-integrated luminance at which an image of the first sequence of image data can be presented during a standard frame rate time interval $\Delta T=1/SFR$ is lower than the time-integrated luminance of the image of the at least one further sequence of image data presented during that time interval. The first sequence of image data can still be seen/recognized by direct viewers, albeit with generally noticeably raised gray levels resulting from the combination of images and inverse images of the further sequences of image data. For instance, the first sequence of image data may only be presented for a fraction, e.g. for half or a third of the standard frame rate time interval.

According to the method of the present disclosure, based on the first and at least second feeds of sequences of image data, the appropriate standard frame rate at which the image data are presented on the active display is selected. If the feeds represent video image data, the appropriate standard frame rate corresponds to the recording standard frame rate of the video.

The active display is operated at a high display frame rate (HDFR) which is higher than the standard frame rate so that during each standard frame rate time interval a certain number of nd HDFR image slots/slices can be presented. As indicated above, during each standard frame rate time interval, at least a first feed intended for direct viewers and a second feed not intended for direct viewers are presented. Consequently, the number of nd HDFR image slots/slices per standard frame rate time interval is at least 2 if the complementary image data for the second feed is mixed into the image intended for the direct viewers but preferably nd will be much higher and at least 4, 8, 12, 16 or 24. Accordingly, each standard frame rate time interval is subdivided into P nd slots/slices in which different image data can be presented. Within the nd image slots/slices of a given standard frame time interval, only image data corresponding to this frame in the standard frame rate of the original feeds is presented but each image content instance can be presented multiple times. Preferably, the respective image data content instance of the first feed intended for direct viewers is presented in multiple of the available nd HDFR image slots/slices.

According to the disclosure, the image data of the first feed and the at least second feed, i.e. the corresponding image data content instances of each standard frame rate time interval, are presented in a time-sliced multiplexed manner distributed within the nd HDFR, image slots of each standard frame rate time interval.

In order to reduce flickering even further, the present disclosure suggests that at least two feeds of said at least first feed and said at least one second feed comprise said gray images obtained from a combination of image data and complementary/inverse image data. The gray images of said at least two feeds are presented at equal luminance on the active display and are evenly distributed within the nd HDFR image slots in such a manner that luminance changes of the active display occur at frequencies greater than or equal to twice the standard frame rate.

According to the present disclosure, there is always one feed intended to be viewed by the direct viewers and flickering of the impression of the first feed occurs by insertion of image data not intended to be viewed by direct viewers. In a first step already described in prior art, flickering is reduced by presenting these additional feeds as a combination of image data and complementary image data. Still, there can be some noticeable flickering and the present disclosure suggests reducing flickering for the direct viewers even further by ensuring that at least two feeds are provided which contain resulting gray images obtained by combinations of images and respective inverse/complementary images. When presenting the gray images on the active display, the present disclosure suggests ensuring that the respective gray images, even stemming from different feeds, are presented at equal luminance on the active display. Further, according to the present disclosure, the gray images are evenly distributed within the nd HDFR image slots/slices in such a manner that luminance changes of the active display occur at frequencies greater than or equal to twice the standard frame rate SFR. An even distribution means that for the gray image distribution within each standard frame rate time interval and even considering subsequent standard frame rate time intervals occur at a certain frequency greater than or equal to twice the standard frame rate. This means that the resulting gray images are not distributed in a manner which results in multiple frequency components but in only one single frequency which is an integer multiple of the standard frame rate.

The term "luminance" denotes is a photometric measure of the luminous intensity per unit area of the active display as measured in candela per square meter (cd/m$^2$), also known as "nit". In contrast "brightness" denotes the subjective impression of the objective but is therefore closely related to the luminance. The term "luminance" in the context of the present disclosure has also a time component taking into account the duration of the individual slots/slices within a standard frame rate time interval. When each standard frame rate time interval is sub-divided into slots/slices of equal duration, the time component can be neglected but if slots/slices of different duration are compared with each other, "luminance" in the sense of the present disclosure denotes the luminous intensity per unit area of the active display times the individual length of the respective slot/slice.

In the physiology of the human eye, it is known that the critical fusion frequency (i.e. the minimum frequency at which flickering vanishes) is proportional to the logarithm of the light intensity (Ferry-Porter Law). In the context of the present disclosure, applicant found that the flickering experience depends on the brightness of both, the content intended to be seen by the direct viewers (first sequence of image data) but also the "hidden content" (further sequences of image data) which, although captured by the human eye, is not intended to be seen/recognized by the direct viewers. The present applicant found that at frequencies of or higher than 100 Hz no flickering is perceived by the human eye of the direct viewers. However, in dark light conditions and/or when displaying darker content, lower frequencies are commonly accepted by the human eye as well without introducing flickering. Therefore, preferably, said luminance changes of said active display occur at frequencies greater than 100 Hz, preferably greater than 120 Hz and particularly preferred greater than 200 Hz.

In many embodiments of the present disclosure, there will be a first feed intended to be viewed by the direct viewers and more than one second feed not intended for the direct viewers, for instance a second feed and a third feed. As the second feeds (i.e. the second, third, fourth feed, etc.) are always presented as a combination of image and inverse image, the above described requirement that at least two feeds are provided which comprise gray images, can be met.

However, in certain embodiments of the present disclosure, especially in embodiments where there is only a first feed and one second feed, i.e. no further second feeds (no further third, fourth, etc. feeds), the above requirement of providing two feeds which comprise image and inverse image to produce a gray image can only be met when the first feed also comprises images and respective complementary/inverse images. As a mere combination of image and inverse image will "hide" the image itself from being perceived by the direct viewers, in such embodiments, the image data of the first feed will be presented in more of the nd HDFR image slots than the complementary image so that a net visible image for the direct viewers of the first feed remains. However, the combination of certain images of the first feed with the respective complementary/inverse image ensures that the criterion of evenly distributing gray images within the HDFR slots such that luminance changes occur at a rate greater than or equal to twice the standard frame rate can be met.

According to a preferred embodiment of the present disclosure, each pair ($F1_k,C1_k$; $F2_k,C2_k$; $F3_k,C3_k$) of images of said at second sequence of image data ($F1_k$; $F2_k$; $F3_k$) and inverse/complementary images of said second complementary sequence of image data ($C1_k$; $C2_k$; $C3_k$) are presented within a time interval of 3.3 ms or less. Flickering and motion blur of the active display for the direct viewers can particularly effectively be minimized if corresponding images and complementary/inverse images are presented within said 3.3 ms time interval. In many applications of the concept of the present disclosure, the second sequence of image data contains images which are intended to be captured by appropriately synchronized video cameras (c.f. WO 2018/138366 A1). In order to allow capturing of a bright image, the time duration at which the images of the second sequence of image data is presented, is preferably as long as possible. In order to meet the constraint of 3.3 ms, the complementary image can also be presented in time slots immediately before and after the HDFR time slot of the second sequence of image data.

In certain embodiments of the present disclosure, every further sequence of image data is provided with the corresponding complementary sequence of image data.

The further sequences of image data can contain various images or video streams. For instance, the further sequences of image data can contain alternative advertisement content which is a captured by an appropriately synchronized video camera. Typically, the video camera is synchronized to only capture the images (F1$_k$; F2$_k$; F3$_k$) while the images corresponding inverse/complementary images (C1$_k$; C2$_k$; C3$_k$) are not recorded.

In one embodiment, each of the nd HDFR slots has the same duration r where $$\tau = \frac{\Delta T}{nd} = \frac{1}{nd \cdot SFR}$$

In another embodiment, the nd HDFR slots of a standard frame rate time interval $\Delta T=1/SFR$ are independent from each other and can therefore have variable durations $\tau_i$, as long as the sum of the durations $\tau_i$ of the nd HDFR slots corresponds to the duration of a standard frame rate time interval 1/SFR, i.e.

$$\sum_{i=1}^{nd} \tau_i = \Delta T = \frac{1}{SFR}$$

In a preferred practical implementation of the method of the disclosure, each presentation of images during an HDFR image slot consists of one or more underlying pulse width modulation frames (PWM-frames, also denoted as "scrambles") during which no new image data is presented but the brightness of the image presented during a HDFR slot is controlled by operating the individual active elements, for instance LED elements, of the active display in accordance with a pulse width modulation scheme.

Preferably, the durations $\tau_i$, $\tau$ of each of said nd HDFR slots are generated via a pulse counter fed by a G-clock (GCLK). Accordingly, rather than employing conventional LED drivers which receive an external PWM-signal via an QE (output enable) pin of the driver, the present disclosure preferably uses active displays which are provided with LED control circuits (LED drivers) which generate PWM-frames (scrambles) from an internally generated G-clock (GCLK) signal which is fed to a pulse counter of the circuit. The actual luminance of an LED is controlled by the PWM-duty cycle, i.e. the ratio at which an LED is in "on"-mode versus "off"-mode during each PWM-time interval. In addition or alternatively to pulse width modulation, the brightness of a HDFR image slot can also be controlled via the current at which an individual active element such as an LED element is operated. By controlling PWM-frames via a G-clock, it is not only possible to generate HDFR slots of equal durations but also HDFR slots of variable durations as will be described in more detail below. The PWM signal controls LED color gradation and luminance. An external PWM signal will suffer distortion and decay in long-range transmission resulting in color and luminance changes. In contrast, using an internally generated G-clock and PWM signal for determining the duration of the HDFR slots and luminance results in high accuracy of the corresponding image frames.

This is particularly useful when pairs of images and complementary/inverse images having different duration in the above referenced variable duration scheme are concerned. In a preferred embodiment of the present disclosure, different durations T of the HDFR image slots can be obtained by changing the frequency of the G-clock while counting the same predetermined number of pulses via the pulse counter. Thus, the method of the present disclosure ensures that both images combine to a precise homogeneous gray image.

When synchronizing cameras capturing a scenery which includes one or more active displays, either a leading or a trailing edge of a HDFR slot can be used as a trigger point and the variable length can be adjusted to the right or to the left of the trigger point.

When video cameras are used which are intended to capture one of the further sequences of image data, usually a synchronization procedure between camera and display has to be conducted to ensure that only the desired HDFR image slot is captured without, e.g. capturing parts of adjacent image slots where, for instance, complementary/inverse images are shown. A preferred procedure involves setting the camera at a much shorter shutter time than required for the actual video shooting so that only a part of the HDFR image slot is captured. Although the captured video will be rather dark in view of the shorter shutter time, it will be more sensitive to interference with adjacent HDFR image slots so that proper synchronization can quickly be achieved. Then, the desired shutter speed is selected according to lighting conditions and video shooting can commence.

In one embodiment of the present disclosure, at least one of said nd HDFR image slots comprises a black phase. The term "black phase" denotes a time interval at which the physical display is a dark, for instance, in case of a LED display, all LEDs are turned off. This can be accomplished by turning off the G-clock (CLK) during the duration of the black phase. The black phase can have a duration of a typical HDFR image slot, preferably however the black phase has a duration of up to 50% of a HDFR image slot. More preferably, the black phase has a duration which is substantially shorter than the duration $\tau_i$ of the respective HDFR image slot. The term "substantially shorter" means that the duration of the black phase is shorter than 20%, preferably shorter than 10%, and particularly preferred shorter than 5% of the duration of the respective nd HDFR image slot. Typically, when standard frame time intervals of, for instance, 20 ms (50 Hz) or 16.7 ms (60 Hz) are employed, the HDFR image slots have a duration in the millisecond range and the inserted black phases have a duration in the range of 0.1 ms. The insertion of a black phases is particularly preferred in the initial part of HDFR image slots associated with further sequences of image data (F1$_k$; F2I; F3$_k$) which are intended to be captured by video cameras. Accordingly, the active display is black during transient oscillations of the amplifiers of the control circuits of the active display (during the settling time of the components of the control circuits), thus allowing the video camera to capture are clean image already exhibiting the desired color and luminescent values. A black phase can also be inserted in the initial phase of images of the first sequence of image data (F0$_k$) but in this case minor deviations in color and luminance are less important because, typically, there are no inverse/complementary images for images of the first sequence of image data.

Flicker of the active display can further be reduced, if at least six HDFR image slots are provided during a standard frame rate time interval $\Delta T=1/SFR$. Preferred numbers of slots during a standard frame rate time interval $\Delta T$ are 12, 24 or 36 HDFR slots.

As indicated above, the further sequences of image data (F1$_k$,C1$_k$; F2$_k$,C2$_k$; F3$_k$,C3$_k$) shown during a standard frame rate time interval $\Delta T=1/SFR$ tend to increase the black level of the images of the first sequence of image data (F0$_k$) intended to be seen by the direct viewers. This increase implied level constitutes a particular problem in a bright environment, for instance at outdoor sports events with sun shining directly on a LED advertisement signboard. Under such conditions, the luminance of the further sequences of image data intended to be captured by a video camera, i.e. sequences of image data $F1_k$; $F2_k$; $F3_k$, has to be increased thus aggravating the problem of black level increase in the first sequence of image data. Consequently direct viewers present at the event will perceive the first sequence of image data as a video feed with some sort of grayish overlay. In order to minimize the black level increase in the first sequence of image data, the present disclosure suggests that HDFR image slots presenting images of the at least second complementary sequence of image data $C1_k$; $C2_k$; $C3i$ also comprise image data of said first sequence of image data ($F0_k$). This allows to increase the ratio of images from the first sequence of image data to images from the further sequences of image data, thus improving the viewing experience of the direct viewers. Similarly, the recordings of unsynchronized a camera as capturing more than one HDFR image slot, for instance a whole standard frame rate time interval, is improved and essentially corresponds to the viewing experience of the direct viewers.

Active displays are usually operated at certain luminance, for instance at 8 bit (256 brightness levels), 9 bit (512 brightness levels), 10 bit (1024 brightness levels), 12 bit or even up to 16 or 24 bit. When the images of the further sequence of image data $F1_k$; $F2_k$; $F3_k$ have to be presented at a high luminance, for instance a due to a bright environment, the corresponding complementary sequence of image data $C1_k$; $C2_k$; $C3_k$ as to be presented a high luminance as well in order for the combined images $F1_k,C1_k$; $F2_k,C2_k$; $F3_k,C3_k$ to form a homogeneous gray sum image. Often, the complementary image data are presented during shorter HDFR image slots then the corresponding further sequence of image data $F1_k$; $F2_k$; $F3_k$, thus requiring even higher luminance of the complementary sequence of image data. Thus, it might be difficult to include additional image data from the first sequence of image data without saturating the corresponding HDFR image slot. Therefore, in a preferred embodiment of the present disclosure, it is suggested that the active light-emitting elements of said active display are operated at an increased electrical current while the luminance (bit-based brightness level) of the complementary image component is proportionally reduced. In certain embodiments, the driver chips for the active elements (e.g. LEDs or OLEDs) can reduce the nominal current (i.e. the value for 100% electrical current) of active light-emitting elements, for instance via adjustable resistors, so that the LEDs can safely be operated even at 100-200% of its nominal current.

Usually, active elements such as LEDs have a nonlinear power-current relationship. Accordingly, when current adjustments are made according to the present disclosure, corrections for this nonlinear behavior have to be applied in order to ensure that no color changes are effected which could otherwise effect the image intended for the direct viewers directly (first sequence of image data) or indirectly by insufficient canceling of the images and inverse/complementary images of further sequences of image data. The respective power current relationship is usually provided by the manufacturer of the active elements and can therefore be implemented in the hardware for controlling the display. Typically, using two (linear approximation), three or four data points and interpolating/extrapolating over the operating range will yield satisfactory results.

In another embodiment, the image slots presenting images of the at least second complementary sequence of image data ($C1_k$; $C2_k$; $C3_k$) comprise image components of the immediately preceding and the immediately following HDFR image slot.

Preferably, the display used in the method of the present disclosure is a LED or OLED (AMOLED) display.

The present disclosure also concerns a system for operating an active display comprising an array of active light-emitting elements, wherein said system comprises a control unit configured to perform the above describe method.

BRIEF DESCRIPTION OF THE DRAWINGS

The present disclosure will now be described in more detail in connection with the attached drawings.

FIG. 3 is the schematic representation of the method of the present disclosure employing two feeds;

FIG. 4 is the schematic representation of the method of the present disclosure employing three feeds;

DETAILED DESCRIPTION

Figure 1:
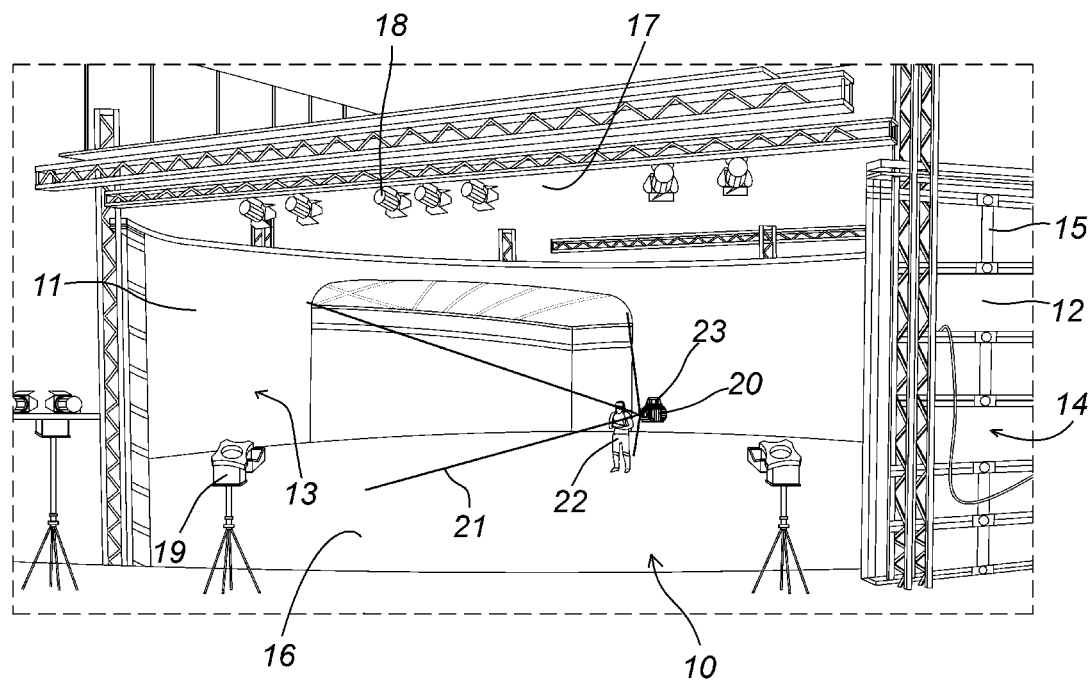
FIG. 1 is a schematic representation of a studio environment, where the method of the present disclosure can be practiced.

FIG. 1 shows a schematic representation of a digital video studio 10, which comprises an LED background wall 11, made from numerous individual LED panels 12. The LED wall 11 is an essentially seamless wall, when viewed from the front side 13, but, as can be seen from the partially visible backside 14 of wall 11, consists of individuals panels 12 fixed on suitable mounting structures 15. The studio 10 further includes an LED floor 16, also made from individual LED panels, as well as an LED ceiling 17, which is also made from individual LED panels. The studio 10 further includes conventional lighting equipment such as top lights 18 and floor lights 19, and one or more digital cameras schematically represented by a camera 20 in FIG. 1. FIG. 1 also denotes the field of view of camera 20 indicated by frustum 21. An actor 22 is shown in front of a camera 20 within the frustum of the camera's field of view. Attached to camera 22 is an auxiliary camera 23 directed in the example of FIG. 1 towards the LED sealing, where tracking patterns can be presented, which will be captured by auxiliary camera 23 attached to main camera 20, from which position and orientation of camera 20 can be derived.

Figure 2:
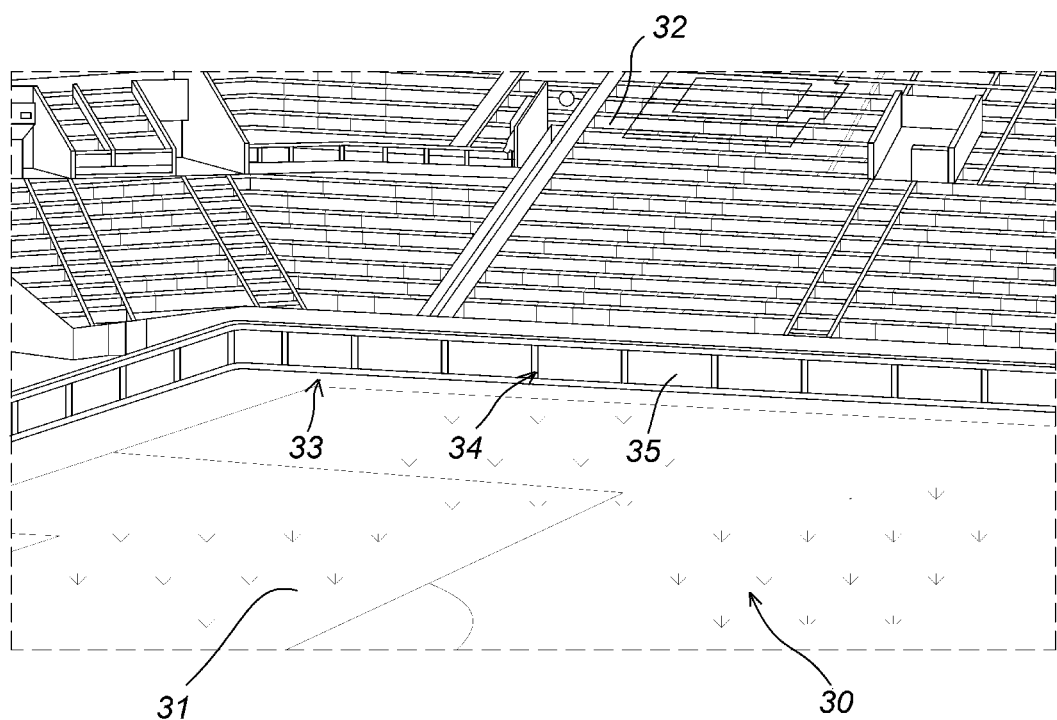
FIG. 2 is a schematic representation of a sports stadium, where the method of the present disclosure can be practiced.

FIG. 2 shows a sports stadium—in the case of FIG. 2 a soccer stadium 30—having a soccer field 31 and a stand structure 32 surrounding the soccer field 31. At the circumference 33 of soccer field 31, an LED row 34 consisting of individual LED panels 35 is provided to show advertisement. In a method of the present disclosure, advertisement to be seen by the viewers present in the stadium can be presented as a first sequence of image data, while chromakey images can be presented as a second sequence of image data. In order to reduce disturbance of the live viewers present in the stadium, the present disclosure provides a third sequence of image data, which consists of image frames representing complementary/inversed images of the chromakey images of the second sequence of image data. In one embodiment, the first sequence of image data can also include tracking patterns, while the third sequence of image data can include complimentary images of said tracking patterns.

In the following, the method of the present disclosure is explained in more detail with reference to a typical sequence of HDFR image slots. In the examples presented, it is assumed that the standard frame rate corresponds to 50 Hz and consequently, the standard frame rate time interval $\Delta T=1/SFR$ corresponds to 20 ms. Only one standard frame rate time interval k is shown in FIG. 3 to 8 but it is understood that corresponding time intervals k−1, k−2, . . . extend to the left of the depicted time interval and corresponding time intervals k+1, k+2, . . . extend to the right of the depicted time intervals. Moreover, in many applications, the number of HDFR image slots will be larger than the number of image slots depicted in the present examples for the sake of simplicity.

FIG. 3 shows a schematic representation of an embodiment of the method of the present disclosure where two different feeds are shown on the active display in a time-sliced multiplexed manner. In the embodiment of FIG. 3, a standard frame rate time interval of 20 ms (50 Hz) is sub-divided into 12 slots/slices, each having a duration of 1.67 ms. In the first column, e denotes the slot number, L the relative luminance at which the respective slot is presented. F0 denotes the first feed intended for direct viewers and F1 denotes the feed not intended for direct viewers. In the embodiment of FIG. 3, only two feeds are provided during each standard frame rate time interval predominantly (in slots 1, 2, 3, 6, 7, 8, 9, 10 and 12), image data content instances intended to be viewed by the direct viewer are displayed on the active display. Image data of the second feed F1 are only shown in slots 4 and 5 as a combination of image F1 and complementary/inverse image C1 so that the combined effect of slots 4 and 5 results in a (albeit not consciously) perceived gray image. To hide the insertion of image content F1 even more, the luminance of slots 4 and 5 is only 30 percent of the luminance of the slots where image data F0 are presented. According to the present disclosure, in order to ensure that in both feeds gray images are presented, slots 10 and 11 are not filled with "regular" representations of image data F0 of the first feed but slots 10 and 11 are used to present an image and an inverse image of the image data of the first feed. Moreover, in order to ensure that luminance changes occur at a defined frequency which is greater than the standard frame rate, the relative luminance of slots 10 and 11 has also been reduced to 30 percent of the luminance of slots 1, 2, 3, 6, 7, 8, 9 and 12. The fact to "hide" one slot of the image data intended to be viewed by direct viewers, namely slot 10, by presenting a corresponding complementary/inverse image in slot 11 is counter-intuitive but effectively reduces flickering resulting from the insertion of a second feed of image data.

FIG. 4 shows a similar example as FIG. 3 but in addition to the first feed intended to be viewed by direct viewers, two additional "second" feeds, namely a second feed F1 and a third feed F2 are presented as combinations of images F1, F2 and respective complementary/inverse images C1, C2, respectively. Similar to the embodiment of FIG. 3, the combination of images and inverse images is presented at a lower relative luminance than the images intended to be viewed by the direct viewers and the resulting gray images are again evenly distributed within the twelve HDFR image slots so that a defined frequency of luminance changes occurs which is greater than the standard frame rate 50 Hz.

The concept of having HDFR image slots of variable length will now be described in more detail. The minimum duration of an image slot equals the minimum transmission time plus Vsync signal. The GCLK Frequency should be varied to show full images within the give time.

Assuming to have a maximum of 12 image slots:
F1 is shown with gain $G_{F1}=0.5$ for $t_{F1}=2$ ms. C1 is then shown for the minimal time of $t_{C1}=1.67$ ms and a gain of $$G_{C1} = \frac{t_{F1}}{t_{C1}} * G_{F1} = \frac{2 \text{ ms}}{1,67 \text{ ms}} * 0.5 = 0.6$$

Figure 5:
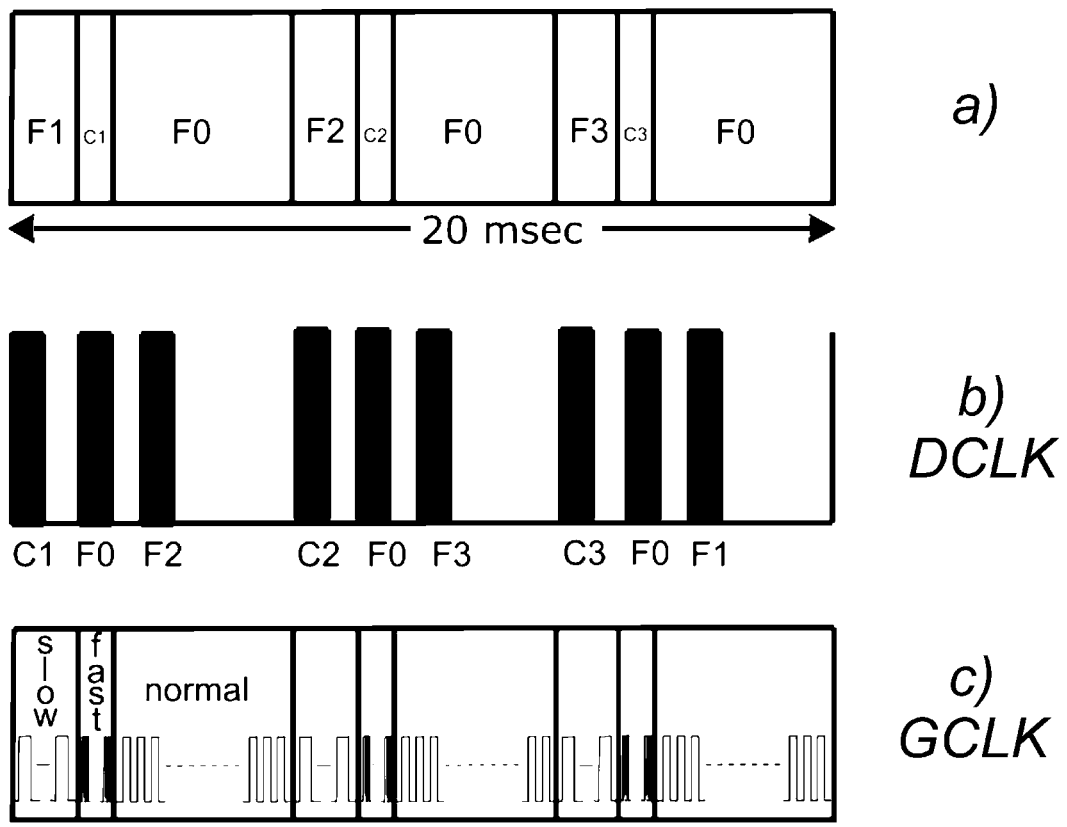
FIG. 5 is a schematic representation of a frame sequence where individual slots have a variable length.

FIG. 5 shows a schematic representation of a frame sequence where individual slots have a variable duration. FIG. 5a) shows an actual sequence of 9 HDFR image slots where a major proportion of the frame time interval is attributed to the first sequence of image data F0 intended to be seen by the direct viewers. Three further sequences of image data F1, F2, F3 are provided, each with its complementary/inverse sequence of image data C1, C2, C3. FIG. 5b) shows the data clock (DCLK) sequence which governs at the transmission of image data. As can be taken therefrom, during presentation of a slot, for instance F1, image data of the following slot C1 are transmitted to the active display, and so on. The image data comprise the luminance values for each LED of the active display. As an example, a LED display having a resolution of 10 bit (1024 luminance levels) comprises an LED which, according to the data clock information shall be operated at 50% of its maximum intensity. Thus, the brightness information (range 0-1023) transferred corresponds to a value of 511. FIG. 5c) shows how this value transferred into are suitable pulse width modulation PWM. A (G-clock (CLK) is generated, for instance at a normal frequency of 10 MHz. In a simple embodiment, a pulse counter counts the number of pulses until the desired value for this image slot (in this example 511) is reached. During the remainder of the pulses of the G-clock, the PWM signal is turned off. Accordingly, PWM signal is operated at a duty cycle of 50%. In a preferred embodiment, however, the active pulses are distributed evenly throughout the time interval of a slot.

Figure 6:
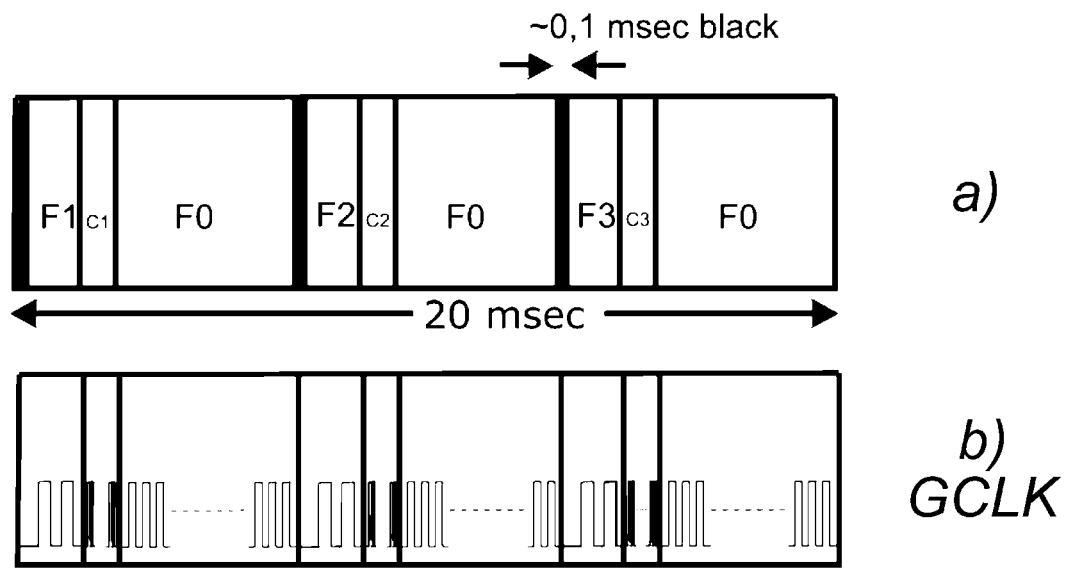
FIG. 6 is a frame sequence similar to the sequence of FIG. 5 with black phase insertion.

FIG. 6 shows a frame sequence similar to the sequence of FIG. 5 with black phase insertion. As can be taken from FIG. 6 a) black phases having a duration of 0.1 ms are inserted in the initial portion of each of the first sequences of image data F1, F2, F3. As can be taken from FIG. 6b), the black phases are generated by switching the G-clock off during the desired black phases.

Figure 7:
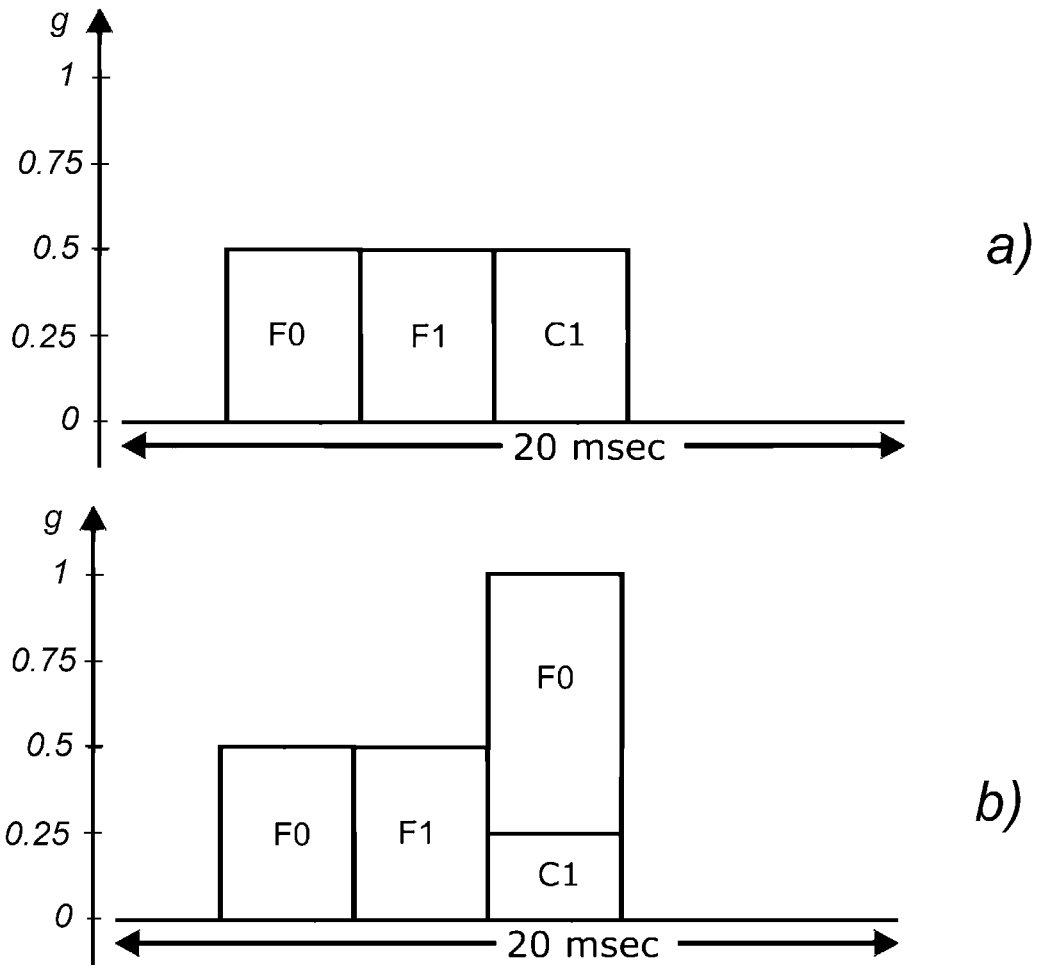
FIG. 7 is a frame sequence showing with increased proportion of a first sequence of image data.

The concept of increasing the brightness of the venue feed i.e. the first sequence of image data F0 intended to be seen by the direct viewers will now be described in more detail: The inverse image is displayed at a higher current, but therefore with reduced luminance level. That way, there is headroom in the color/luminance space left and the content for the human eye of the direct viewers can be added to the image. FIG. 7 shows an example of this concept, assuming a PWM controlled brightness range of 10 bit, i.e. from 0 (black) to 1023 (maximum) intensity. The image gain factor is the proportion of the PWM controlled image brightness within that range, i.e. gain=0 corresponds to a 10-bit value of "0" and gain=1 corresponds to a 10-bit value of "1023". The actual luminance of an active light-emitting element (e.g. a LED) of the active display is given by the gain factor time the electrical current at which the element is operated times the gain factor. In a basic embodiment of the method of the present disclosure shown in FIG. 7a) F1 is displayed with gain 0.5 (i.e. at 511 bit PWM level) and current 0.2 and the complementary/inverse image C1 is displayed with the same gain and current so that the sum of F1 and C1 results in a featureless gray image. In the embodiment shown in FIG. 7b) F1 is displayed with gain 0.5 (i.e. at 511 bit PWM level) and current 0.2 and the complementary/inverse image C1 is displayed with the same gain and current so that the sum of F1 and C1 results in a featureless gray image. In the embodiment shown in FIG. 7b) F1 is also displayed with gain 0.5 and current 0.2 but C1 is displayed with gain 0.25 and current 0.4 so that the sum of F1 and C1 still results in a featureless gray image but the venue feed F0 for the direct viewers can still be added with gain 0.75 so that the overall proportion of the venue feed is increased. It has, however to be born in mind that the current-intensity relation of R, G and B LEDs varies. Thus, a color correction needs to be performed. It needs to be ensured the luminance level, at which the image content is complemented remains constant. No matter which current setting is chosen for the inverse image slot. Here it is helpful to keep in mind the amount of light (essentially the number of photons) is proportional to the luminance/brightness level B and gain G, with the current c (c ∈ [0.2], as the factor is given by the driver chip current setting) and the time t the image is displayed:

$$n_{ph} \sim G * B * c * t$$

Figure 8:
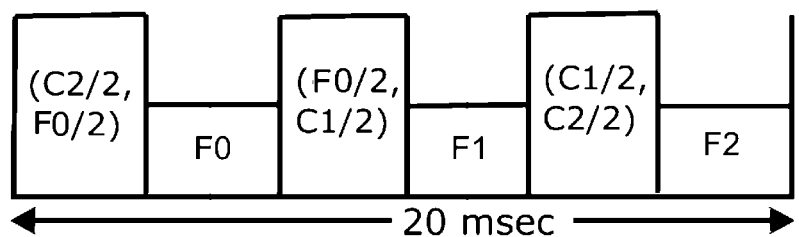
FIG. 8 is an alternative embodiment of the scheme of FIG. 7.

FIG. 8 shows an extension to the scheme of FIG. 7 where two inverse images immediately preceding and flowing a given further sequence of image data F0 (venue feed), F1 (first parallel feed), F2 (second parallel feed) plus additional image content of the venue feed are combined in one HDFR image slot to provide a frame sequence having an increased proportion of first sequence of image data F0. This allows for more flexibility and capability, especially in a low slot system like the LED floor system "Black Marble" commercialized by ROE Visual.

Further, this approach of HDFR image slots with variable duration can be combined with the concept of increasing the luminance of the first sequence of image data (venue feed): Accordingly, the gain of the inverse image can be calculated by:

$$G_{C1} = \frac{t_{F1} * c_{F1}}{t_{C1} * c_{C1}} * G_{F1} = \frac{2 \text{ ms} * 0.2}{1,67 \text{ ms} * 0.4} * 0.5 = 0.3$$

With the currents taken from the example before. Hence, 0.7*F0 can be added to the color corrected inverse image. Under certain circumstances some driver chips can be modified by pretending to have more scanlines, but that technique has several disadvantages. However, the minimum display time would be decoupled from the transmission time.

While the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, while of possible benefit in some embodiments of the disclosure, may not be desirable, and may therefore be absent, in other embodiments.

What is claimed is:

1. A method for operating an active display comprising an array of active light-emitting elements, said method comprising the-steps of:

providing a first feed of a first sequence of image data ($F0_k$) intended to be seen by direct viewers;

providing at least one second feed of a second sequence of image data ($F1_k$, $C1_k$, F2k, $C2_k$; $F3_k$, $C3_k$) not intended to be seen by said direct viewers, said at least second feed comprising a second sequence of image data ($F1_k$; $F2_k$; $F3_k$) and a second complementary sequence of image data ($C1_k$; $C2_k$; $C3_k$) consisting of inverse/complementary image data to said second sequence of image data such that a combination of each image of said second sequence and said second complementary sequence of image data ($F1_k$ and $C1_k$; $F2_k$ and $C2_k$; $F3_k$ and $C3_k$) results in second homogenous gray images;

selecting a standard frame rate (SFR) at which said first and said at least second sequences of image data are presented on said active display;

operating the active display at a high display frame rate (HDFR) comprising nd HDFR image slots/slices during a standard frame rate time interval ΔT=1/SFR of said standard frame rate (SFR), each HDFR image slot having a duration $\tau_i$ with $$\sum_{i=1}^{nd} \tau_i = \Delta T = \frac{1}{SFR};$$

presenting said image data of said first feed and said at least second feed in a time-sliced multiplexed manner on said active display in said nd HDFR image slots of each standard frame rate time interval, wherein a time-integrated luminance of said first sequence of image data presented during a standard frame rate time interval is higher than a sum of time-integrated luminances of said second sequences of image data;

wherein at least two feeds of said first feed and said at least one second feed comprise said second homogenous gray images obtained from said combination of said second sequence of image data and second complementary sequence of image data ($F1_k$ and $C1_k$; $F2_k$ and $C2_k$; $F3_k$ and $C3_k$), said second homogenous gray images being presented at equal luminance on said active display and being evenly distributed within said nd HDFR image slots in such a manner that luminance changes of said active display occur at frequencies greater than or equal to twice said standard frame rate (SFR);

wherein:
said first feed of said first sequence of image data ($F0_k$) further comprises a first complementary sequence of image data ($C0_k$) consisting of inverse/complementary image data to said first sequence of image data such that a combination of each image of said first sequence of image data and said first complementary sequence of image data ($F0_K$ and $C0_k$) results in first homogenous gray images, and gray images of said at least two feeds comprise first homogenous gray images from said first feed ($F0_K$ and $C0_k$) and second homogenous gray images from said second feed ($F1_k$ and $C1_k$), wherein at least one of the nd HDFR image slots shows a regular representation of the first sequence of image data at a first luminance, one of the nd HDFR image slots shows a representation of the second sequence of image data, one of the nd HDFR image slots shows a representation of the second complementary sequence of image data, one of the nd HDFR image slots shows a representation of the first sequence of image data at a luminance lower than the first luminance and one of the nd HDFR image slots shows a representation of the first complementary sequence of image data at a luminance lower than the first luminance.

2. The method of claim 1, wherein said luminance changes of said active display occur at frequencies greater than 100 Hz.

3. The method of claim 1, wherein each pair ($F0_K$, $C0_k$; $F1_k,C1_k$; $F2_k$, $C2_k$; $F3_k,C3_k$) of images of said second sequence of image data ($F1_k$; $F2_k$; $F3_k$) and inverse/complementary images of said second complementary sequence of image data ($C1_k$; $C2_k$; $C3_k$) are presented within a time interval of 3.3 ms or less.

4. The method of claim 1, wherein said HDFR image slots of a standard frame rate time interval $\Delta T$ have the same length $\tau$.

5. The method of claim 1, wherein said nd HDFR image slots of a standard frame rate time interval $\Delta T$ have variable lengths $\tau_i$.

6. The method of claim 1, wherein lengths $\tau_i$, $\tau$ of each of said HDFR image slots are generated via a pulse counter fed by a G-clock (GCLK).

7. The method of claim 6, wherein different durations $\tau_i$, $\tau$ of said HDFR image slots are obtained by changing the frequency of the G-clock (GCLK) while counting the same predetermined number of pulses via said pulse counter.

8. The method of claim 1, wherein at least one of said HDFR image slots comprises a black phase having a duration which is shorter than a duration $\Delta_i$ of the respective HDFR image slot.

9. The method of claim 8, wherein the duration of the black phase is shorter than 20% of the duration of said HDFR image slot.

10. The method of claim 1, wherein at least six HDFR image slots are provided during a standard frame rate time interval $\Delta T=1/SFR$.

11. The method of claim 1, wherein HDFR image slots presenting images of said at least second complementary sequence of image data ($C1_k$; $C2_k$; $C3_k$) also comprise image data of said first sequence of image data ($F0_k$).

12. The method of claim 11, comprising operating said active light-emitting elements of said active display at an increased electrical current while reducing the luminance of the complementary image component proportionally.

13. The method of claim 11, wherein said HDFR image slots presenting images of said at least second complementary sequence of image data ($C1_k$; $C2_k$; $C3_k$) comprise image components of the immediately preceding and the immediately following HDFR image slot.

14. The method of claim 1, wherein said active display is an LED or OLED display.

15. A system for operating an active display comprising an array of active light-emitting elements, said system comprising a control unit configured to perform the method of claim 1.

16. A method for operating an active display, the method comprising steps of:

providing a first feed of a first sequence of image data ($F0_K$) intended to be seen by direct viewers;

providing a second feed of a second sequence of image data ($F1_k,C1_k$; $F2_k,C2_k$; $F3_k,C3_k$) not intended to be seen by the direct viewers, the second feed comprising a second sequence of image data ($F1_k$; $F2_k$; $F3_k$) and a second complementary sequence of image data ($C1_k$; $C2_k$; $C2_k$),-a combination of each image of said second sequence and said second complementary sequence ($F1_k$ and $C1_k$; $F2_k$ and $C2_k$;$F3_k$ and $C3_k$) resulting in second homogenous gray images;

selecting a standard frame rate (SFR) at which the first and the at least second sequences of image data are presented on the active display;

operating the active display at a high display frame rate (HDFR) comprising HDFR image slots during a standard frame rate time interval of the standard frame rate (SFR), each HDFR image slot having a duration, a sum of HDFR image slots equal to the standard frame rate time interval;

presenting the image data of the first feed and the at least second feed in a time-sliced multiplexed manner on the active display in the HDFR image slots of each standard frame rate time interval, wherein a time-integrated luminance of the first sequence of image data presented during a standard frame rate time interval is higher than a sum of time-integrated luminances of the second sequences of image data;

wherein at least two feeds of the first feed and the at least one second feed comprise the second homogenous gray images obtained from the combination of the second sequence of image data and the second complementary sequence of image data ($F1_k$ and $C1_k$; $F2_k$ and $C2_k$; $F3_k$ and $C3_k$), the second homogenous gray images being presented at equal luminance on the active display and being evenly distributed within the HDFR image slots in such a manner that luminance changes of the active display occur at frequencies greater than or equal to twice the standard frame rate (SFR);

wherein: the first feed of the first sequence of image data ($F0_k$) further comprises a first complementary sequence of image data ($C0_k$) consisting of inverse/complementary image data to the first sequence of image data such that a combination of each image of the first sequence of image data and the first complementary sequence of image data ($F0_k$ and $C0_k$) results in first homogenous gray images, and gray images of the at least two feeds comprise first homogenous gray images from the first feed ($F0_K$ and $C0_k$) and second homogeneous gray images from the second feed ($F1_k$ and $C1_k$), wherein at least one of the HDFR image slots shows a regular representation of the first sequence of image data at a first luminance, one of the HDFR image slots shows a representation of the second sequence of image data, one of the HDFR image slots shows a representation of the second complementary sequence of image data, one of the HDFR image slots shows a representation of the first sequence of image data at a luminance lower than the first luminance and one of the HDFR image slots shows a representation of the first complementary sequence of image data at a luminance lower than the first luminance.

17. A method for operating a display, comprising the steps of:
providing a first feed of a first sequence of image data ($F0_k$) and providing a second feed of a second sequence of image data ($F1_k, C1_k; F2_k, C2_k; F3_k, C3_k$), the second feed comprising a second sequence of image data ($F1_k, F2_k; F3_k$) and a second complementary sequence of image data ($C1_k; C2_k; C3_k$), a combination of each image of the second sequence and the second complementary sequence of image data ($F1_k$ and $C1_k; F2_k$ and $C2_k; F3_k$ and $C3_k$) resulting in second homogenous gray images;
selecting a standard frame rate (SFR) at which the first and the at least second sequences of image data are presented on the display;
operating the display at a high display frame rate (HDFR) comprising a plurality of HDFR image slots during a standard frame rate (SFR) time interval;
displaying the first feed and the second feed in a time-sliced multiplexed manner in the plurality of HDFR image slots of each SFR time interval, a time-integrated luminance of the first sequence of image data presented during a standard frame rate time interval being higher than a sum of time-integrated luminances of the second sequences of image data;
wherein:
the first feed and the second feed comprise second homogenous gray images obtained from the combination of the second sequence of image data and the second complementary sequence of image data ($F1_k$ and $C1_k; F2_k$ and $C2_k; F3_k$ and $C3_k$) presented at equal luminance and being evenly distributed within the plurality of HDFR image slots so luminance changes of the display occur at frequencies greater than or equal to twice the SFR;
the first feed of the first sequence of image data ($F0_K$) further comprises a first complementary sequence of image data ($C0_k$) consisting of inverse/complementary image data to the first sequence of image data such that a combination of each image of the first sequence of image data and the first complementary sequence of image data ($F0_K$ and $C0_K$) results in first homogenous gray images; and
gray images of the at least two feeds comprise first homogenous gray images from the first feed ($F0_K$ and $C0_k$) and second homogenous gray images from the second feed ($F1_k$ and $C1_k$), wherein at least one of the plurality of HDFR image slots shows a regular representation of the first sequence of image data at a first luminance, one of the plurality of HDFR image slots shows a representation of the second sequence of image data, one of the plurality of HDFR image slots shows a representation of the second complementary sequence of image data, one of the plurality of HDFR image slots shows a representation of the first sequence of image data at a luminance lower than the first luminance and one of the plurality of HDFR image slots shows a representation of the first complementary sequence of image data at a luminance lower than the first luminance.

* * * * *